(12) United States Patent
Majoria

(10) Patent No.: US 10,562,108 B2
(45) Date of Patent: Feb. 18, 2020

(54) SELF-CENTERING DRILL BIT

(71) Applicant: Reagan Majoria, Destin, FL (US)

(72) Inventor: Reagan Majoria, Destin, FL (US)

( * ) Notice: Subject to any disclaimer, the term of this patent is extended or adjusted under 35 U.S.C. 154(b) by 0 days.

(21) Appl. No.: 15/969,285

(22) Filed: May 2, 2018

(65) Prior Publication Data

US 2019/0015906 A1 Jan. 17, 2019

Related U.S. Application Data

(60) Provisional application No. 62/546,348, filed on Aug. 16, 2017, provisional application No. 62/531,247, filed on Jul. 11, 2017.

(51) Int. Cl.
*B23B 51/04* (2006.01)

(52) U.S. Cl.
CPC ...... *B23B 51/0426* (2013.01); *B23B 51/0473* (2013.01); *B23B 2251/50* (2013.01)

(58) Field of Classification Search
CPC ............ B23B 2251/50; B23B 51/0426; B23B 51/0473; B23B 51/04; B23B 47/28
See application file for complete search history.

(56) References Cited

U.S. PATENT DOCUMENTS

| 2,725,766 | A | * | 12/1955 | Van Heukelom | ....... B24B 15/00 408/145 |
|---|---|---|---|---|---|
| 4,203,692 | A | | 5/1980 | Jensen | |
| 4,749,315 | A | | 6/1988 | Mills | |
| 4,968,189 | A | | 11/1990 | Pidgeon | |
| 5,413,437 | A | | 5/1995 | Bristow | |
| 5,435,672 | A | * | 7/1995 | Hall | ..... B23B 51/0453 408/204 |
| 5,743,682 | A | | 4/1998 | Chaney, Sr. | |
| 5,820,315 | A | | 10/1998 | Collard | |
| 6,409,437 | B1 | | 6/2002 | Metzger | |
| 6,676,343 | B2 | | 1/2004 | Burk | |
| 6,881,017 | B1 | | 4/2005 | Krecek et al. | |
| 6,929,430 | B2 | * | 8/2005 | Dever | ............... B23B 51/0426 408/1 R |
| 7,237,984 | B1 | | 7/2007 | Guzda et al. | |
| 7,513,718 | B1 | * | 4/2009 | Arnold | ................ B23B 51/0426 408/1 R |
| 7,850,405 | B2 | | 12/2010 | Keightley | |
| 8,696,268 | B2 | * | 4/2014 | Bell | ..................... B23B 51/0426 408/115 R |
| 8,753,048 | B2 | | 6/2014 | Naughton | |
| 8,827,603 | B2 | * | 9/2014 | Eck | ....................... B23B 47/281 408/1 R |
| 2014/0308084 | A1 | | 10/2014 | James | |

FOREIGN PATENT DOCUMENTS

| GB | 2333255 | 2/2003 |
|---|---|---|
| JP | 2009-148872 | 7/2009 |
| JP | 2010-253898 | 11/2010 |

* cited by examiner

*Primary Examiner* — Nicole N Ramos
(74) *Attorney, Agent, or Firm* — Sheridan Ross PC

(57) ABSTRACT

A cutting tool is provided that is operable to provide a circular cut or hole in a material or work piece. In various embodiments, a guide member is provided that facilitates alignment of a cutting edge of the invention with a pre-existing cut, hole or aperture. Devices and methods of the present disclosure provide for quick and easy centering of a cutting tool in order to form an enlarged hole that is concentric with a pre-existing hole.

20 Claims, 9 Drawing Sheets

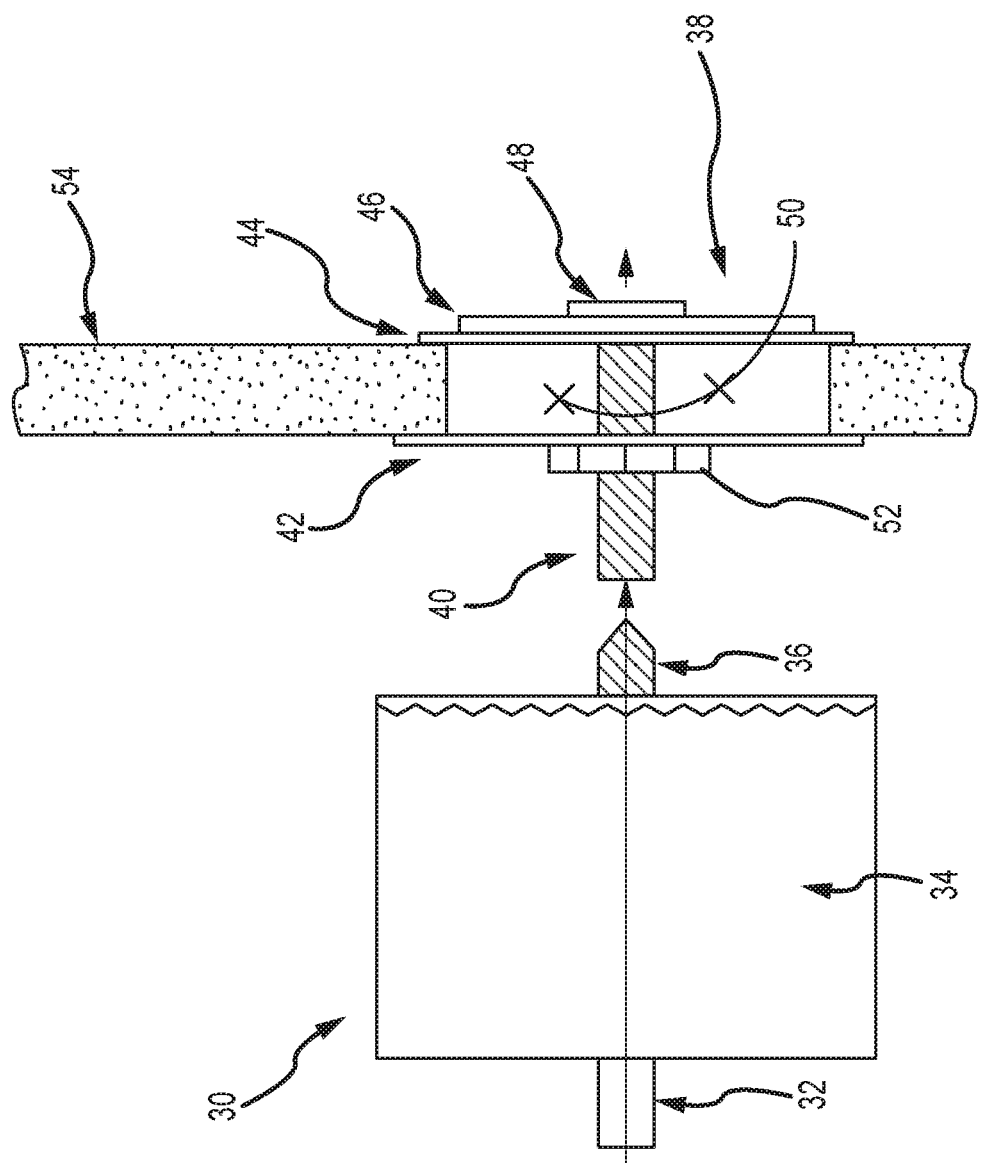

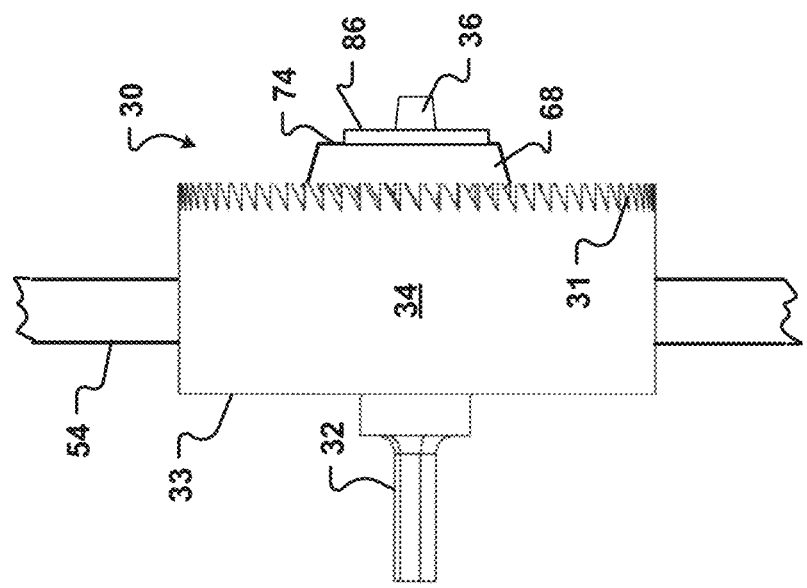
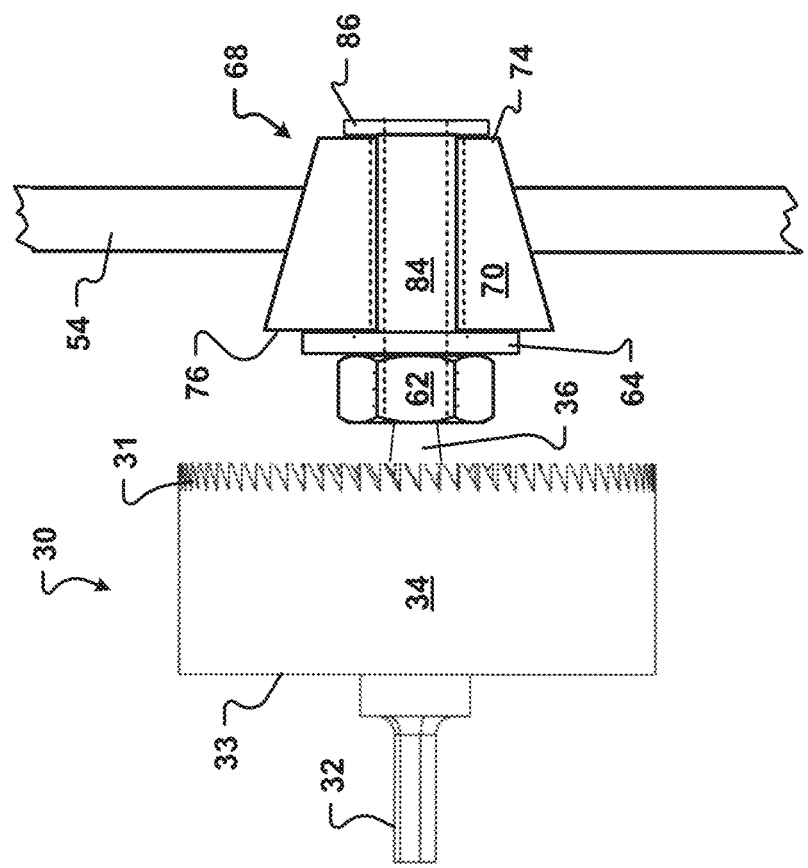

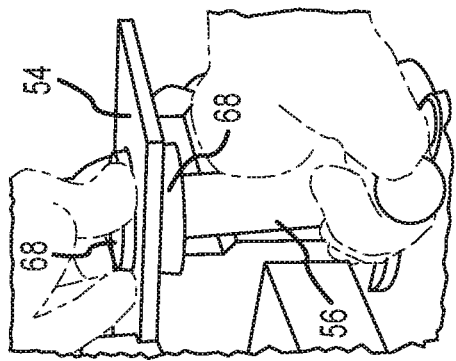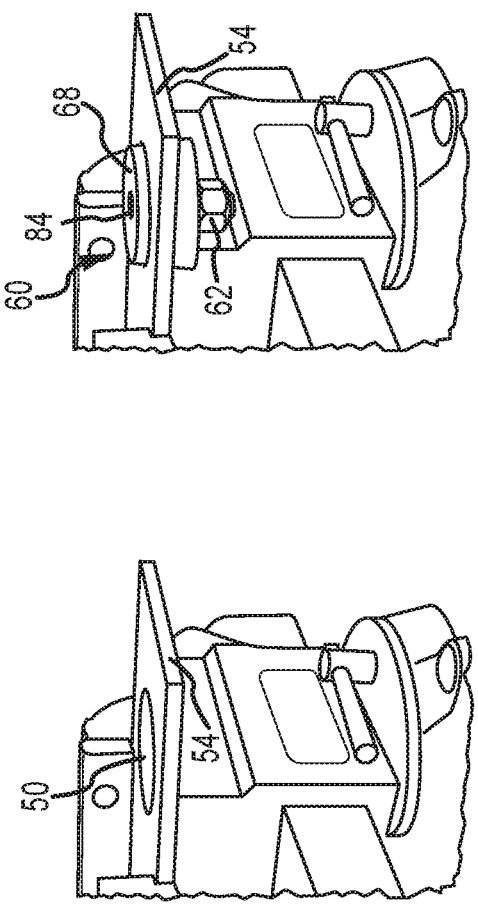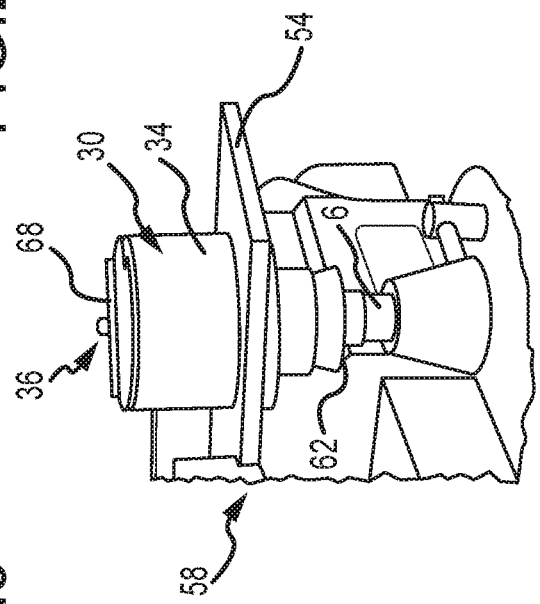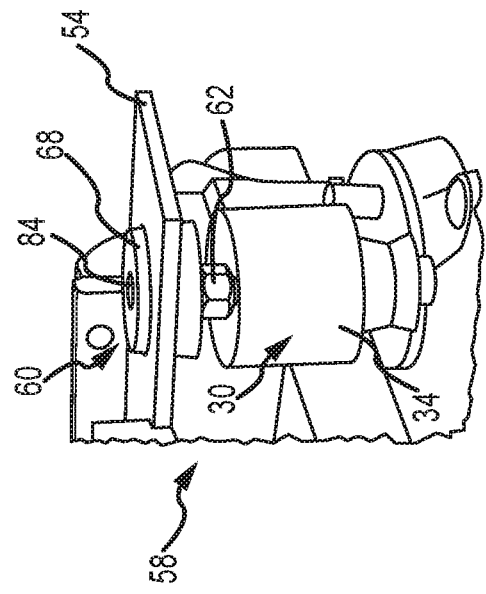

SELF-CENTERING DRILL BIT

CROSS-REFERENCE TO RELATED APPLICATIONS

This application claims priority under 35 U.S.C. § 119(e) to U.S. Provisional Patent Application Ser. No. 62/531,247, filed Jul. 11, 2017, and to U.S. Provisional Patent Application Ser. No. 62/546,348, filed Aug. 16, 2017, which are each incorporated herein in their entirety by reference.

FIELD

The present disclosure relates generally to methods and devices for cutting tools. More specifically, embodiments of the present disclosure relate to improved hole saws and bits for cutting into an object or surface.

BACKGROUND

Hole saws typically include a pilot bit and a saw body. The pilot bit includes an arbor at a first end portion of the pilot bit and a drill bit at a second end portion of the pilot bit. The arbor is configured to be received in a chuck of a rotary tool, such as a drill. The drill may be electric powered or manually operated. The drill bit is often a spiral drill bit. The saw body is coupled to the pilot bit for rotation with the pilot bit and the saw body includes a circular cutting edge corresponding to the circumference and diameter of a hole to be formed in an object. Such devices are generally operable to form a hole of a desired size in a work-piece. These devices, however, are inaccurate or even useless in situations where a pre-existing hole is provided in the work-piece and a user desires to increase the size of the pre-existing hole.

The following U.S. patents relate to cutting tools and are hereby incorporated by reference in their entireties: U.S. Pat. No. 4,203,692 to Jensen, U.S. Pat. No. 4,749,315 to Mills, U.S. Pat. No. 6,409,437 to Metzger, U.S. Pat. No. 7,513,718 to Arnold, U.S. Pat. No. 8,696,268 to Bell, and U.S. Pat. No. 8,753,048 to Naughton. The aforementioned references fail to teach various novel features and devices of the present disclosure as shown and described herein.

SUMMARY

Accordingly, there has been a long-felt but unmet need to provide a hole saw bit that is operable to enlarge an existing hole or aperture in a work-piece. In various embodiments, hole saws are provided that are operable for use with a rotary tool. For example, in some embodiments, hole saws comprise a guide member including a first end portion and a second end portion. The first end portion is configured to detachably couple the hole saw to a rotary tool. The rotary tool can be powered by any means. In one embodiment, the rotary tool is manually powered by a user. Alternatively, the rotary tool can be electrically powered or pneumatically powered. The hole saw further comprises a saw body including a circular cutting edge having a cutting edge diameter, and the saw body is coupled to the guide member for rotation with the guide member. A pilot is coupled to the guide member for movement relative to the guide member and the saw body in a direction from the second end portion of the guide member toward the first end portion of the guide member, and the pilot includes an outer guide surface having a diameter that increases in the direction from the second end portion of the guide member toward the first end portion of the guide member. The pilot is coupled to the guide member such that at least a portion of the outer guide surface of the pilot extends past the circular cutting edge of the saw body in a direction from the first end portion of the guide member toward the second end portion of the guide member. The pilot member is operable to engage a pre-existing aperture or hole in a work piece and to center and align the hole saw such that the cutting edge is provided co-axially with the pre-existing aperture. Such alignment enables a user to reliably and accurately increase a diameter of the aperture without changing a position of the center point of the aperture.

In some embodiments, a hole saw is provided that is operable to cut an aperture having a diameter into a work-piece, and the work-piece has a pre-existing guide aperture having a second diameter less than the first diameter. The hole saw comprises a guide member including a first end portion, a second end portion, and a longitudinal axis that extends centrally through the first end portion and the second end portion of the guide member. The hole saw further comprises a saw body including a circular cutting edge with a cutting edge diameter, and the saw body is coupled to the guide member for rotation with the guide member about the longitudinal axis of the guide member. A pilot is coupled to the guide member for movement relative to the guide member and the saw body in a direction from the second end portion of the guide member toward the first end portion of the guide member parallel to the longitudinal axis of the guide member. The pilot further comprises an outer guide surface having a diameter that increases in the direction from the second end portion of the guide member toward the first end portion of the guide member parallel to the longitudinal axis of the guide member. The pilot is coupled to the guide member and is operable to be received in the guide aperture of the work-piece to position the circular cutting edge of the saw body concentric with the guide aperture.

In some embodiments, the pilot member comprises a frustoconical rubber stopper member that is operable to frictionally engage with an interior portion of an aperture in a work-piece. In certain embodiments, a plurality of pilot members are provided such that a user may choose an appropriately sized pilot member for a specific application (e.g. based on an existing hole diameter). The stopper member is preferably secured by one or more pins or fasteners.

In various embodiments, a hole saw is provided that is secured to a bit shank. In such embodiments, the bit shank, hole saw, and related assembly is removed and replaced with a different part when holes of different sizes are to be formed. In some embodiments, the hole saw is selectively detachable from the bit shank, and is secured to the bit shank via a set screw, for example.

In preferred embodiments, at least one bearing member is provided that renders the cutting edge of the device rotatable at least with respect to the pilot member or stopper. In some embodiments and methods of use, the pilot or stopper engages an existing hole and a force of friction between the stopper and at least a portion of the existing hole substantially prevents the stopper from rotating. The bearing member enables the cutting member to rotate relative to the workpiece and the stopper, allowing for easier and more accurate cutting.

One aspect is an alignment device to guide a rotary tool to create an aperture in a workpiece. The alignment device includes, but is not limited to, one or more of: (1) a centering device that is operable to engage a pre-existing hole in the workpiece, the centering device including a first bore and a body portion; (2) a fastener including a shank, a flange, and a second bore through the shank, the shank to be positioned within the first bore such that a portion of the shank extends from the first bore; and (3) a threaded nut that engages the portion of the shank, wherein, when the threaded nut is tightened, the threaded nut applies a compressive force to the centering device such that a diameter of the body portion increases and the centering device is secured to the aperture of the workpiece.

Another aspect of the present disclosure is a tool configured for use with a rotary tool. The tool includes, but is not limited to, one or more of: (1) a rotary cutting tool comprising a circular cutting edge, a pilot member extending axially beyond the circular cutting edge, and a bit shank configured to be selectively coupled to the rotary tool; (2) a centering device comprising a frustoconical body and a first bore through the frustoconical body; (3) a fastener positionable within the first bore of the centering device, the fastener including a shank having a length greater than a length of the first bore through the frustoconical body, threads formed on at least a portion of the shank, and a second bore through the shank operable to receive the pilot member, wherein the rotary cutting tool is axially-displaceable relative to the centering device; and (4) a threaded nut operable to engage the threads of the shank, wherein the threaded nut is operable to compress the frustoconical body to engage an aperture in a workpiece.

In one embodiment, the fastener further comprises a bearing member within the second bore. Optionally, the fastener is fixed within the first bore. In another embodiment, a flange extends from the fastener shank. The flange engages a distal end of the centering device when the fastener is positioned within the first bore, the distal end having a first diameter that is less than a second diameter of a proximal end of the centering device. The first diameter is less than a diameter of the aperture such that when the frustoconical body is engaged to the aperture, the distal end of the centering device extends from the aperture beyond a distal surface of the workpiece. In one embodiment, the flange has a tapered cross section with a diameter that increases as the flange extends axially away from the shank. Optionally, the flange comprises a washer. Alternatively, the flange can be integrally formed with the fastener.

In one embodiment, the rotary cutting tool is rotatable relative to the second bore of the fastener. Optionally, the frustoconical body is formed of a compressible or an elastomeric material. In another embodiment, the frustoconical body is formed of rubber.

In one embodiment, the first bore has a substantially constant diameter. Additionally, or alternatively, the second bore may have a substantially constant diameter.

In one embodiment, the pilot of the rotary cutting tool has a cylindrical body. Optionally, the cylindrical body of the pilot has a substantially smooth exterior surface. More specifically, in one embodiment, the pilot is not threaded or grooved. Additionally, or alternatively, the pilot may have a distal end with a frustoconical shape. For example, the pilot may have a distal end with a diameter that is less than a medial portion of the pilot.

Another aspect is an alignment device to guide a rotary cutting tool that is operable to create an aperture in a workpiece. The alignment device comprises: (1) a centering device that is operable to engage a pre-existing hole in the workpiece, the centering device including a first bore and a body portion; (2) a fastener including a shank and a second bore through the shank, the shank configured to be positioned within the first bore such that a threaded portion of the shank extends from the first bore; and (3) a threaded nut operable to engage the threaded portion of the shank, wherein the threaded nut is operable to apply a force to the centering device such that a diameter of at least a portion of the body portion increases and the centering device is secured to the aperture of the workpiece. In one embodiment, one or more of the first and second bores have a substantially constant diameter.

In one embodiment, the body portion of the centering device has a frustoconical shape with a distal end that has a first diameter and a proximal end that has a second diameter that is greater than the first diameter. Optionally, the body portion is formed of rubber.

In another embodiment, the shank of the fastener is rotationally fixed within the first bore. In another embodiment, the second bore is configured to receive a rotating pilot of the rotary cutting tool without translating a rotational force to the fastener. Optionally, the second bore includes at least one bearing member. In one embodiment, at least a portion of shank is fixed to the body portion of the centering device.

In one embodiment, the fastener further includes a flange. In one embodiment, the flange is fixed to the shank. Alternatively, the flange may comprise a washer positionable on the shank.

It is another aspect of the present disclosure to provide a method of forming an aperture in a work-piece with a pre-existing hole, comprising: (1) providing a centering device including a body portion with a small end, a large end, a bore extending from the small end to the large end, and a fastener extending through the bore with a threaded shank extending from the large end; (2) extending the small end of the centering device through the pre-existing hole such that the body portion of the centering device contacts the work-piece; (3) tightening a nut on the threaded shank of the fastener such that the body portion is compressed by the fastener, wherein the body portion of the centering device is clamped to the work-piece; (4) providing a rotary cutting tool with a circular cutting device; (5) aligning a pilot of the rotary cutting tool with a second bore extending through the fastener; and (6) rotating the rotary cutting tool to form the aperture in the work-piece.

In one embodiment, the method further comprises placing a washer on the threaded shank between the nut and the large end of the body portion. Optionally, the method may further comprise placing a washer between the small end of the body portion and a distal end of the threaded shank.

In one embodiment, the pilot of the rotary cutting tool has a substantially smooth cylindrical body. Specifically, in one embodiment, the pilot is not threaded.

In one embodiment, the method further includes interconnecting a bit shank of the rotary cutting tool to chuck of an electric drill or a brace.

It will be expressly recognized that the devices and features shown and described herein are not limited to the embodiment or embodiments with which they are described or shown in combination with. Various combinations of features shown herein are contemplated, even if such combinations are not shown in the drawings or specifically described in the Specification.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

FIG. 11 is a front elevation of a cutting tool system according to another embodiment of the present disclosure.

FIG. 12.

FIG. 17 is another front elevation view showing the centering device engaged in the pre-existing hole.

FIG. 18 illustrates the rotary cutting tool of FIG. 16 engaged with the centering device to enlarge the pre-existing hole in the work-piece.

FIGS. 19-23 generally illustrate a method of enlarging a pre-existing hole in a work-piece with a cutting tool guided by a centering device according to one embodiment of the present disclosure.

Figure 3:
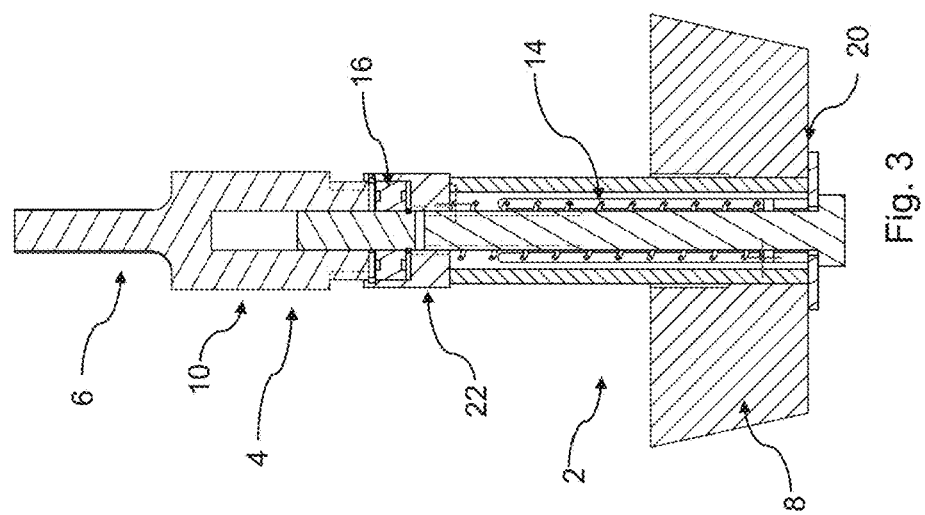
FIG. 3 is a cross-sectional front elevation view of the cutting tool according to the embodiment of FIG. 1.

The following is a listing of components according to various embodiments of the present disclosure, and as shown in the drawings:

2 Cutting tool
4 Bit portion
6 Shank
8 Stopper
10 Collar member
12 Threaded shaft
13 Female shaft
14 Coil spring
16 Bearing member
18 Cutting tool
20 Flange
22 Bearing seat
24 Pins
30 Rotary cutting tool
31 Teeth
32 Bit shank
33 Closed end
34 Circular cutting device body
35 Interior diameter
36 Pilot
37 Open end
38 Alignment and centering device
40 Fastener comprising a threaded tube of alignment device
42 First flange (washer)
44 Rubber washer or ring
46 Second washer
48 Fixed washer
50 Pre-existing hole
51 Hole edge
52 Threaded nut
54 Work piece
58 alignment and centering device
60 Alignment device
62 Threaded nut
64 Washer
68 Centering device
69 Longitudinal axis
70 Body portion
72 Bore
74 Bottom end
76 Top end
80 Fastener
82 Shank
84 Bore
86 Flange It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
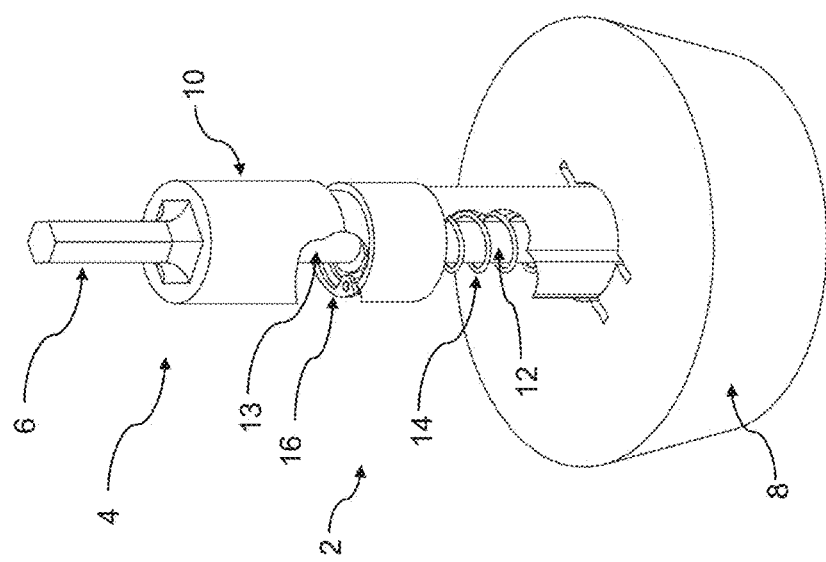
FIG. 1 is a front perspective view of a cutting tool according to one embodiment of the present disclosure.

FIG. 1 is a front perspective view of a cutting tool 2 according to one embodiment of the present disclosure. As shown, the device 2 comprises a bit portion 4 and a centering device in the form of a stopper 8 provided at one end of the bit portion 4. The centering device 8, as will be shown and described in more detail herein, comprises a frustoconical rubber stopper that is operable to be provided in contact with an existing hole or aperture to align cutting features of the tool 2 and ultimately to align a cutting tool concentrically with the existing aperture. The bit portion 4 comprises a bit shank 6 that is operable to connect to a pre-existing device, such as a known drill chuck (not shown in FIG. 1). The bit shank 6 is interconnected to and in force-transmitting communication with a collar member 10. In preferred embodiments, a hole saw or similar device with a cutting edge extends from the collar member 10 (not shown in FIG. 1, but see 18 in FIG. 2). In various embodiments, the bit shank 6, the collar member 10 and the cutting tool are connected or co-formed such that they are co-rotational and wherein a rotation of the bit shank 6 (such as by way of a powered drill) causes a rotation of each of these elements.

However, in preferred embodiments of the present disclosure, certain additional elements of the device 2 are rotationally coupled to a remainder of the device such that at least some elements of the device are operable to rotate relative to one another. An object of at least some embodiments of the present disclosure is provide a hole-centering and alignment device that is not caused to rotate when a cutting tool or surface of the device is rotated. Specifically, embodiments of the present disclosure provide a device with a stopper 8 and associated components that are not caused to rotate when a cutting tool of the device is rotated, thereby preventing a torque from being applied to a workpiece when the cutting tool is employed to create an additional or larger aperture in the workpiece. As one of ordinary skill in the art will recognize, providing a device wherein each element is fixed relative to the other elements will provide a rotational cutting tool and a stopper or alignment device that rotates with the cutting tool, thereby providing a rotational force on the workpiece via the stopper or alignment device which is an undesirable condition. Accordingly, preferred embodiments of the present disclosure provide a device that is operable to provide a rotational force to a cutting edge of the device but allows a stopper or similar alignment member to remain substantially stationary. The device 2 of FIG. 1 comprises a bearing member 16 to connect the bit shank 6 and the stopper 8 in a manner wherein the components are rotatable relative to one another.

As shown in FIG. 1, the stopper 8 is axially displaceable relative to bit shank 6. During a cutting operation, and as will be recognized by one of ordinary skill in the art, the stopper 8 will preferably remain in a fixed position relative to a workpiece. In order to form a cut or through-hole in a workpiece, the cutting tool (e.g. hole saw) will be displaced and move through a thickness of the workpiece in order to form the aperture.

As shown in FIG. 1, the stopper 8 is connected to and displaceable with a threaded shaft 12. The shaft 12 is provided with a coil spring 14 which biases the stopper 8 away from the bit shank 6 and is operable to return the stopper 8 to an extended position. Preferably, the force of the coil spring 14 is easily overcome during a cutting operation wherein a user can apply a force on the cutting tool to drive the cutting tool through a workpiece and wherein the spring 14 does not provide substantial resistance to this process. The threaded shaft 12 is displaceable within and can be received by a female shaft 13 such at least a portion of a length of the threaded shaft 12 is received within an interior volume of the female shaft 13. Accordingly, a distal end of the device 2 that comprises the stopper 8 and the threaded shaft 12 is displaceable relative to a proximal end of the device 2 that comprises the bit shank 6 and the collar member 10.

Figure 2:
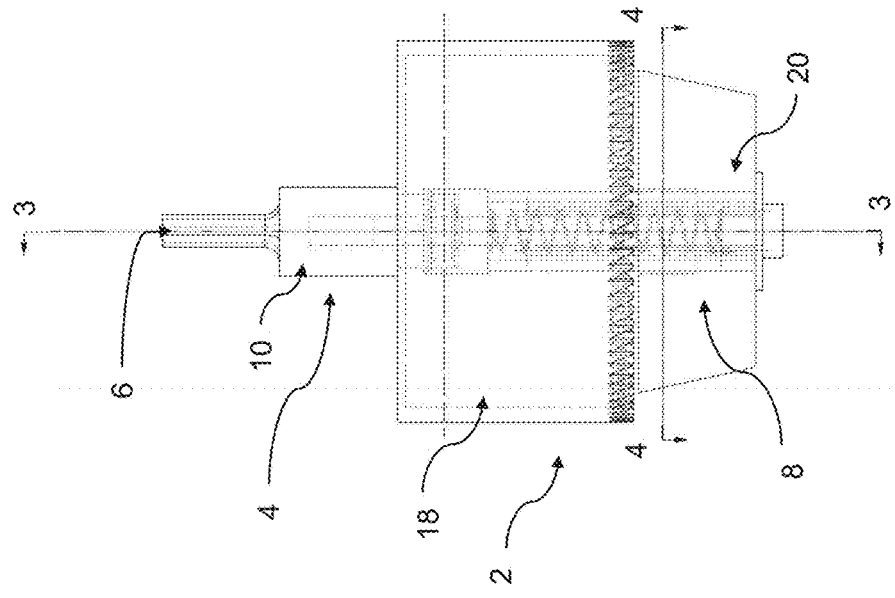
FIG. 2 is a front elevation view of the cutting tool according to the embodiment of FIG. 1, and wherein certain features are shown in phantom for illustrative purposes.

FIG. 2 is an elevation view of the device 2 as shown in FIG. 1. Various features of FIG. 2 are provided in phantom for illustrative purposes. As shown in FIG. 2, the device 2 comprises a cutting tool 18. The cutting tool 18 of FIG. 2 is provided as a hole saw that is coaxial with the stopper member 8. The stopper member 8 is operable to extend into a pre-existing hole in a workpiece. The stopper 8 of the embodiment provided in FIG. 2 comprises a minimum diameter of approximately 2.00 inches and a maximum diameter of approximately 2.50 inches. The stopper 8 comprises a height of approximately 1.0 inches. Accordingly, the stopper of FIG. 2 is operable to engage a pre-existing hole of at least about 2.0 inches and not more than about 2.50 inches and is further operable to enlarge said preexisting hole by aligning a circular cutting edge of the cutting tool 18. It should be recognized, however, that the dimensions provided in FIG. 2 are to illustrate one particular embodiment and no limitation with respect to dimensions or proportions is provided or implied by FIG. 2.

The stopper 8 of FIG. 2 is secured to the threaded shaft 12 on a distal end by a washer member or flange 20. The stopper 8 is thus rotationally fixed relative to the threaded shaft 12. The bit shank 6, collar member 10, and cutting tool 18 are rotatable relative to the stopper 8 by way of the bearing member 16.

FIG. 3 is a cross-sectional elevation view of the device 2 according to the embodiment of FIG. 1 taken along line 3-3 of FIG. 2. As shown, a bearing member 16 is provided to enable rotation between a first portion of the device 2 that comprises the bit shank 6 and the collar member 10, and a second portion comprising a stopper 8. Although not shown in FIG. 3, a cutting tool is preferably connected to secured to the collar member 10 such that the cutting tool is rotatable with the bit shank 6 and collar member 10. The bearing member enables rotation of the cutting tool while the stopper 8 and related components are substantially rotationally fixed. In operation, the stopper 8 will be at least partially inserted into a pre-existing aperture or hole in a work piece, and a frictional force between the stopper 8 and the work piece is sufficient to prevent rotation of the lower portion of the device 2 while the upper portion (including the cutting tool) is free to rotate and form a larger hole that is concentric with the original hole.

As shown in FIG. 3, the coil spring 14 extends between a bearing seat 22 and the stopper 8 and wherein the spring extends at least partially into the stopper 8. In some embodiments, a support surface is provided within or in combination with the stopper 8. For example, and as shown in FIG. 4, a pair of supports pins 24 are provided in the stopper to provide a support surface for the spring 14.

Figure 5:
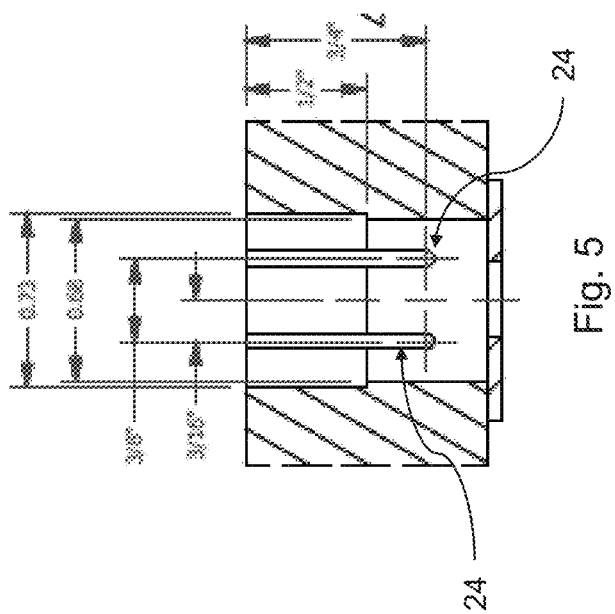
FIG. 5 is a cross-sectional elevation view of the cutting tool according to the embodiment of FIG. 1.
Figure 4:
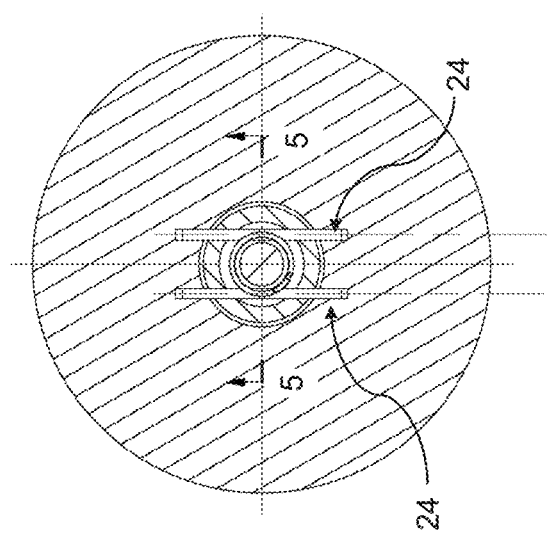
FIG. 4 is a cross-sectional plan view of the of the cutting tool according to the embodiment of FIG. 1.
Figure 7:
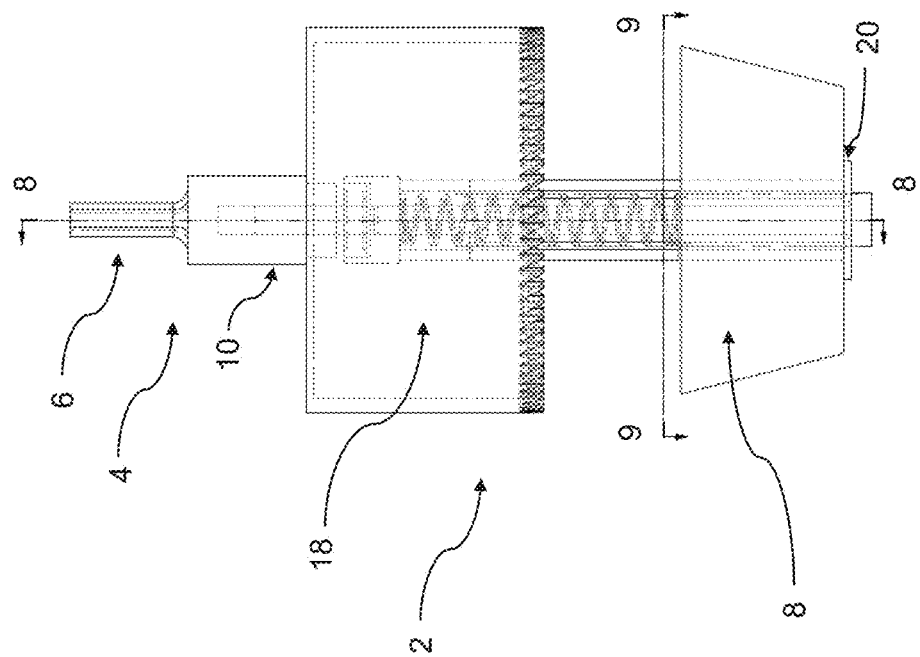
FIG. 7 is a front elevation view of the cutting tool according to the embodiment of FIG. 6, and wherein certain features are shown in phantom for illustrative purposes.
Figure 6:
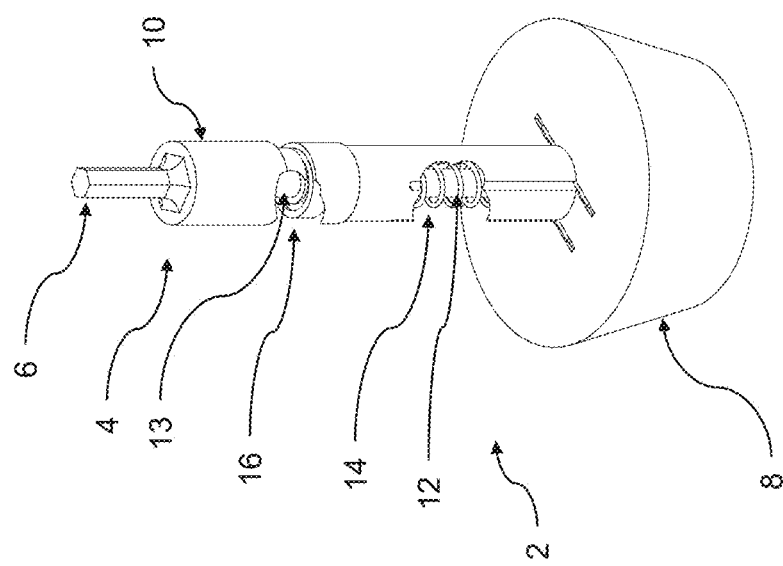
FIG. 6 is a front perspective view of a cutting tool according to one embodiment of the present disclosure.
Figure 10:
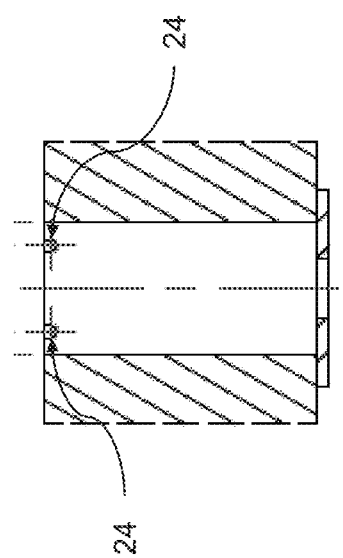
FIG. 10 is a cross-sectional elevation view of the cutting tool according to the embodiment of FIG. 6.
Figure 9:
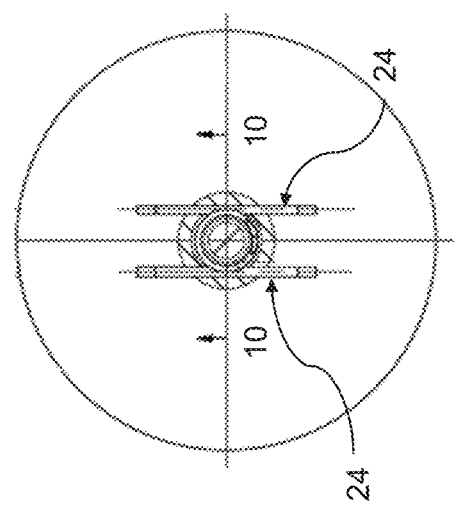
FIG. 9 is a cross-sectional plan view of the of the cutting tool according to the embodiment of FIG. 6.
Figure 8:
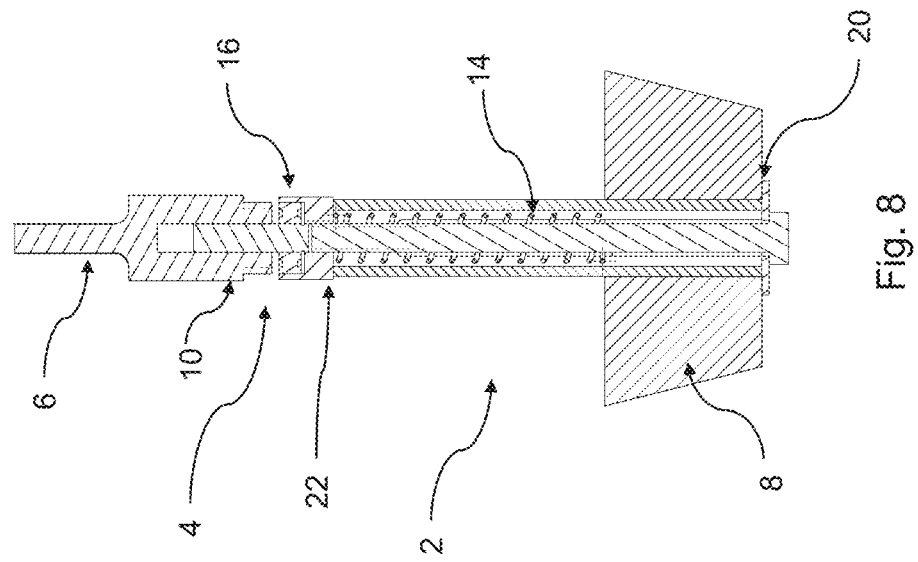
FIG. 8 is a cross-sectional front elevation view of the cutting tool according to the embodiment of FIG. 6.
Figure 13:
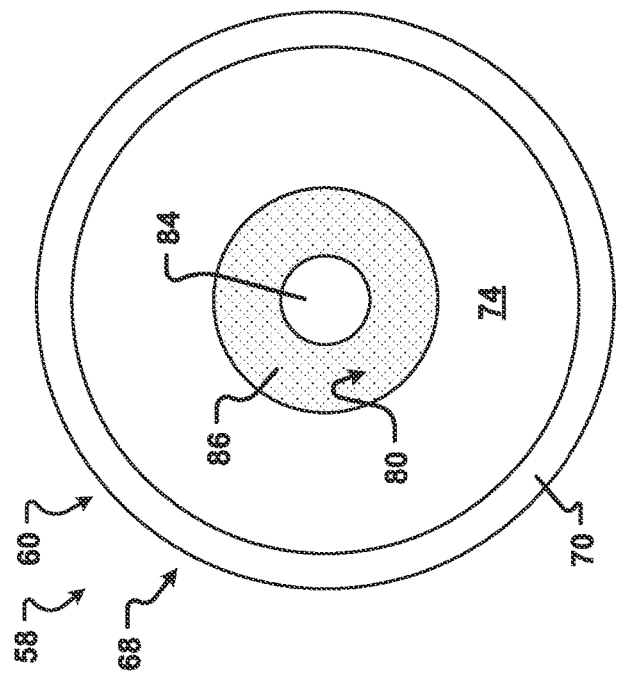
FIG. 13 is a bottom plan view of the of the centering device according to the embodiment of FIG. 12.

FIG. 4 is a cross-sectional plan view of the device 2 shown in FIG. 2 and taken at line 4-4 of FIG. 2. As shown, a pair of support pins 24 are provided on opposing sides of the threaded shaft 12. FIG. 5 is a cross-sectional elevation view taken at line 5-5 of FIG. 4. As shown, the pins 24 comprise a length of approximately 1.0 inch and a height of approximately 0.75 inches.

FIGS. 6-10 provide various views of a device 2 according to another embodiment of the present disclosure. Various features previously shown and described with respect to FIGS. 1-5 are provided in FIGS. 6-10, and the discussion of such features is not repeated with respect to FIGS. 6-10. The embodiment of FIG. 6-10 provides a device 2 of similar construction to that of FIGS. 1-5, but wherein the spring 14 does not extend into the stopper 8. As shown in FIGS. 6-10, the pins 24 of at least one embodiment are provide at an upper edge of the stopper 8 such that the spring 14 does not extend into the stopper. Instead, the spring 14 rests upon and contacts an upper edge of the stopper 8. The general principles of operation of the device 2 shown in FIGS. 6-10 are the same as that described in FIGS. 1-5, the discussion of which is hereby incorporated by reference in its entirety.

FIG. 11 is a side elevation view of a cutting tool system according to another embodiment of the present disclosure. As shown in FIG. 11, a cutting tool is provided that comprises a rotary cutting tool 30 and an alignment and centering device 38. The rotary cutting tool 30 and the centering device 38 comprise separate components that are operable to interact with each other to enlarge a pre-existing hole or aperture.

The rotary cutting tool 30 comprises a bit shank 32 and a circular cutting device 34 such as a hole saw. The rotary cutting tool 30 further comprises a pilot 36 that is operable to communicate with the centering device 38 to align the circular cutting device 34. In some embodiments, the entire rotary cutting tool 30 is rotatable. For example, it is contemplated that the bit shank 32, the circular cutting device 34 and the pilot 36 are rotationally fixed and are rotated by a hand drill, for example. In alternative embodiments, it is contemplated that the device 30 of FIG. 11 comprises at least one bearing member to allow for rotation of the bit shank 32 and the circular cutting device 34 while the pilot 36 is free to remain fixed and/or rotate independently.

In FIG. 11, the centering device 38 is shown relative to a work piece 54 which may comprise various materials and/or devices. The work piece 54 comprises a pre-existing hole 50. The centering device 38 comprises a device that is selectively securable within the pre-existing hole 50. For example, and as shown in FIG. 11, the centering device 38 is provided in and secured to the pre-existing hole 50 by a plurality of flange members and a fastener comprising a hollow threaded tube 40. A first flange or washer 42 is provided on one side of the work piece 54. At least one additional washer 46 may be provided on an opposing side of the work piece 54. In the embodiment of FIG. 11, a rubber washer or ring 44 is optionally provided between the second washer 46 and the work piece to provide friction and limit rotation of various elements. The fastener 40 comprises a fixed washer or nut 48 forming a flange at one end, an open opposing end, and a threaded outer surface. A threaded nut 52 is provided. The threaded nut 52 is operable to provide a securing or clamping force to the centering device 38.

The fastener 40 comprises an at least partially hollow member that is operable to receive the male pilot 36 of the cutting device 30. The insertion and alignment of the pilot 36 with the fastener 40 provides for alignment of the cutting device 34 relative to additional elements and the pre-existing aperture 50. Accordingly, the correct installation of the centering device provides for a guide member that is operable to receive a cutting tool 30 as shown in FIG. 11 and to provide a concentric cut that enlarges the preexisting hole 50.

Referring now to FIGS. 12-18, another embodiment of an alignment and centering device 58 is shown. The alignment and centering device 58 generally includes an alignment device 60 of similar construction to the alignment and centering device 38 of the embodiment described in conjunction with FIG. 11. Various features previously shown and described with respect to FIGS. 1-11 are provided in FIGS. 12-18 and the discussion of such features is not repeated with respect to FIGS. 12-18.

The alignment device 60 generally comprises a centering device 68 with a bore 72 which receives a fastener 80. The centering device 68 is similar to centering device 8. In one embodiment, the centering device 68 comprises a resilient material such as rubber. The shape of the centering device 68 is selected to provide contact with an existing hole or aperture 50 to align cutting features of a cutting device 30 with the existing aperture. The bore 72 is generally concentric with a longitudinal axis 69 of the centering device. In one embodiment, the bore 72 has a diameter that is substantially constant along the longitudinal axis.

In one embodiment, the centering device 68 has a shape that is generally frustoconical. More specifically, the centering device 68 has a body portion 70 which increases in diameter from a bottom end 74 to a top end 76. The bottom end 74 has a first diameter which is less than a second diameter of the top end 76. The first diameter is less than an interior diameter of the pre-existing hole 50. The second diameter of the top end 76 is greater than the interior diameter of the pre-existing hole. Accordingly, the bottom end 74 of the centering device 68 is configured to extend distally beyond a back surface of a work piece when a medial portion of the body 70 contacts the edges of the pre-existing hole, as generally illustrated in FIG. 17.

Figure 15:
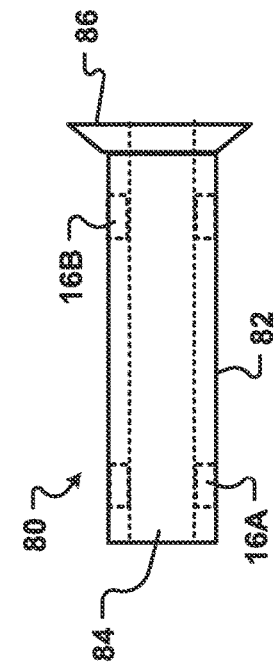
FIG. 15 is side elevation view of a fastener of FIG. 14 of the centering device of FIG. 12 with internal features shown in phantom lines for illustrative purposes.
Figure 12:
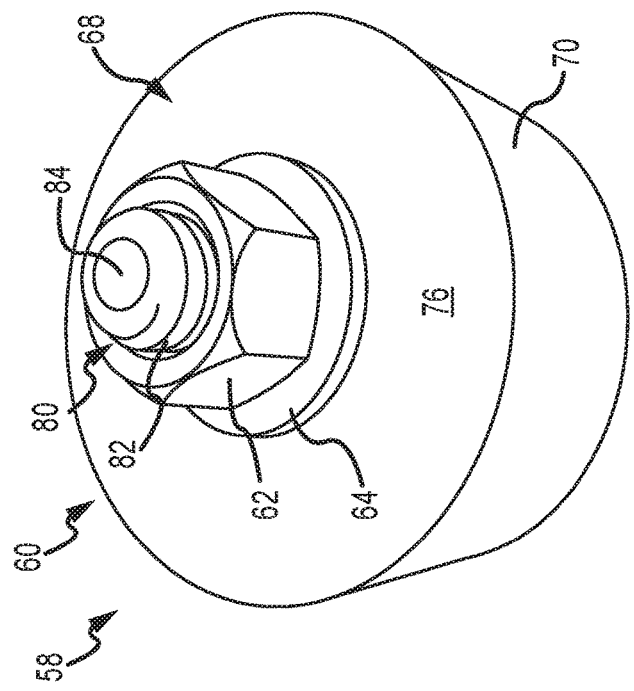
FIG. 12 is a front perspective view of a centering device of a cutting tool according to one embodiment of the present disclosure.
Figure 14:
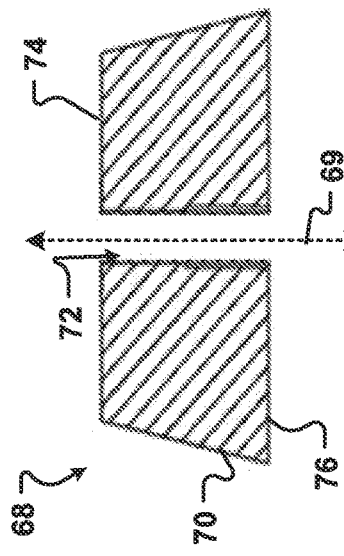
FIG. 14 is a cross-sectional elevation view of the centering device of FIG. 12.

The fastener 80 is sized to fit in the bore 72 of the centering device 68. In one embodiment, the fastener 80 includes a shank 82, a flange 86, and a bore 84. The flange 86 extends generally radially from the shank 82. In one embodiment, the flange 86 has a tapered or wedge shaped cross-section such as generally illustrated in FIG. 15. The wedge of the flange 86 is configured to fit at least partially into the bore 72 of the centering device 68. When the flange 86 is positioned proximate to the bottom end 74 of the centering device, at least a portion of the shank 82 extends beyond the top end 76, for example, as illustrated in FIG. 12. In some embodiments, the fastener 80 does not comprise a wedge feature and a lateral expansion of the body portion 70 is achieved by tightening the nut 62 to provide a compressive force upon body portion 70 and allow the body portion to expand outwardly and secure the device in an existing aperture of a work piece.

The fastener bore 84 has an internal diameter not less than an exterior diameter of a pilot 36 of a rotary cutting tool 30. The pilot 36 is thus axially displaceable relative to the fastener 80. In one embodiment, the internal diameter of the bore 84 is about equal to the pilot exterior diameter. Optionally, at least one bearing member 16 (the same as or similar to the bearing 16 illustrated in FIG. 8) may be positioned within the fastener bore 84. Accordingly, the pilot 36 is rotatable relative to the fastener 80 and will not transmit a torque to the fastener 80 or to the alignment device 60. In this manner, the rotary cutting tool does not apply a torque to the workpiece 54 through the alignment device 60.

The shank 82 has an exterior diameter not greater than the diameter of the bore 72 of the centering device. In one embodiment, the shank 82 is fixed within the bore 72. For example, the shank 82 can be glued or cemented into the bore. Optionally, anti-rotation features, such as protrusions or pins, may extend from the shank to engage the alignment device. Accordingly, in one embodiment, the fastener 80 may not rotate with respect to the alignment device 58. More specifically, the fastener 80 is rotationally fixed relative to the centering device 68. Threads, illustrated in FIG. 12, are formed along at least a portion of length of the shank 82 to receive a fastener, such as a threaded nut 62.

In one embodiment, the threaded nut 62 includes a tapered head facing the centering device 68. More specifically, the threaded nut 62 can have a sloping exterior surface that decreases in diameter towards the centering device. A portion of the sloping exterior surface proximate to the centering device 68 may have an exterior diameter that is less than the interior diameter of the bore 72 through the centering device 68. Similarly, a portion of the sloping exterior surface distal to the centering device 68 has an exterior diameter that is greater than the interior diameter of the bore 72.

Optionally, a washer 64 may be positioned on the shank 82 between the top end 76 of the centering device and the threaded nut 62. In one embodiment, the washer 64 is interconnected to the threaded nut 62.

The threaded nut 62 is operable to provide a clamping force to the centering device 68. By tightening the threaded nut 62 on the shank 82, the centering device 68 is at least partially compressed between the threaded nut 62 and the flange 86. When the threaded nut 62 is rotated in a closing direction with respect to the shank 82, the threaded nut 62 moves toward the flange 86 such that the centering device 68 is compressed. In this manner, the body portion 70 of the centering device 68 is deformed. More specifically, the body portion 70 bulges outwardly away from the device bore 72 and the exterior diameter of at least a portion of the body portion 70 increases as a distance between the flange 86 and the threaded nut 62 decreases. The body portion 70 thus engages interior edges 51 of the pre-existing hole. In this manner, the centering device 68 is held within a pre-existing hole 50 of a work-piece 54. Thus, the alignment device 60 is selectively interconnected or secured to the work-piece 54.

In one embodiment, one or more of the threaded nut 62 and the flange 86 have a wedge or tapered portion proximate to the centering device 68. Accordingly, as the threaded nut 62 is rotated in the closing direction, a wedge of at least one of the threaded nut 62 and the flange 86 fit at least partially into the bore 72 of the centering device 68. The wedge expands at least an exterior surface of the body portion 70.

Figure 16:
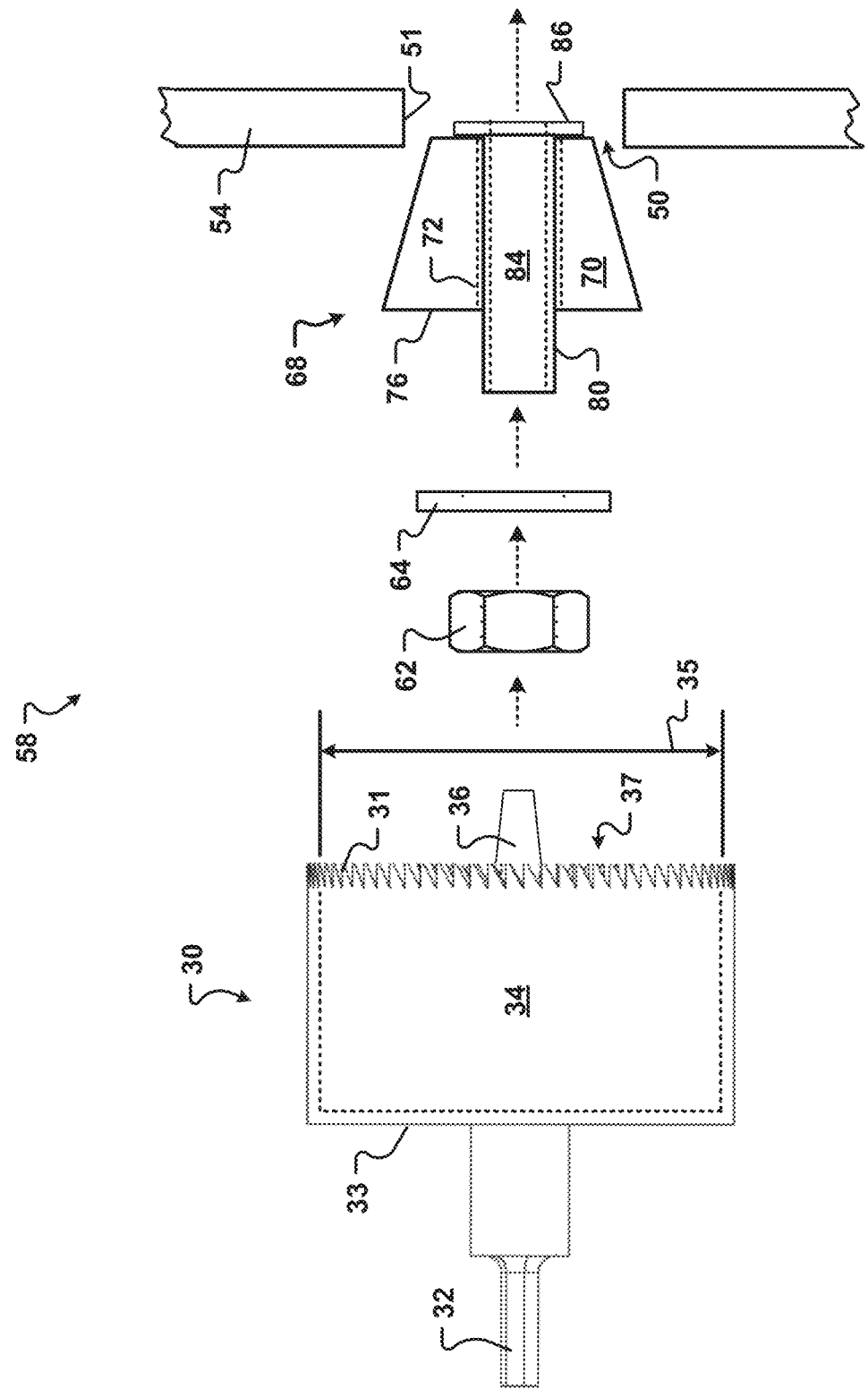
FIG. 16 is an exploded front elevation view of the centering device of FIG. 12 and a rotary cutting tool proximate to a workpiece with a pre-existing hole.

Referring now to FIGS. 16-18, a method of enlarging a pre-existing hole 50 in a work-piece 54 with a rotary cutting tool 30 guided by an alignment and centering device 58 according to one embodiment of the present disclosure is generally illustrated. The centering device 68 is operable to engage the pre-existing hole 50 and to center and align the rotary cutting tool 30 such that the cutting edge is provided co-axially with the pre-existing aperture. Such alignment enables a user to reliably and accurately increase a diameter of the pre-existing hole 50 without changing a position of the center point of the pre-existing hole.

In one embodiment, the rotary cutting tool 30 comprises a separate component that is operable to interact with the alignment device 60. The rotary cutting tool 30 generally includes a cylindrical body 34 with an open end 37 having cutting teeth 31. The cutting teeth 31 extend generally continuously around the circumference of the cylindrical body 34 to define a circular cutting edge with a cutting edge diameter. The cutting edge diameter is greater than a diameter of the pre-existing hole 50.

An interior diameter 35 of the open end is greater than the exterior diameter of the top end 76 of the centering device 68. Accordingly, the centering device 68 may be received at least partially within the open end 37 of the cylindrical body 34

A closed end 33 of the body interconnects the cylindrical body 34 to the bit shank 32. A pilot 36 extends axially beyond the cutting teeth. The pilot 36, cutting teeth 31, and shank 32 are substantially concentrically aligned.

The pilot 36 has a diameter predetermined to fit within the bore 84 of the fastener. According, the rotary cutting tool is axially displaceable with respect to the centering device 68. In addition, the pilot 36 can rotate within the bore 84 without imparting a rotational force to the fastener 80. Accordingly, in one embodiment, the centering device 68 will remain in a fixed position relative to a workpiece as the rotary cutting tool forms a second larger hole in the work-piece 54.

A body portion 70 of a centering device 68 is positioned in the pre-existing hole 50. More specifically, body portion 70 is positioned within the pre-existing hole 50 such that the bottom end 74 projects at least partially beyond a distal surface of the work piece 54.

After the centering device 68 is positioned in the pre-existing hole 50, a threaded nut 62 is tightened on a shank 82 of a fastener 80 of the alignment device 60. As the threaded nut 62 is tightened, the threaded nut applies a force to the centering device 68 which bulges or deforms outwardly against the pre-existing hole 50. Optionally, a wrench or socket may be used to rotate the threaded nut 62.

Referring now to FIG. 17, the alignment device 60 is secured or interconnected to the work-piece 54. The pilot 36 of a rotary cutting tool 30 is aligned with the bore 84 through the fastener 80. The rotary cutting tool 30 is powered such that the cutting teeth 31 cut through the work-piece 54 to create a larger hole as shown in FIG. 18.

Referring now to FIGS. 19-23, a method of enlarging a pre-existing hole 50 in a work-piece 54 with a cutting device 58 guided by an alignment device 60 according to one embodiment of the present disclosure is generally illustrated. A body portion 70 of a centering device 68 is positioned in the pre-existing hole 50 as illustrated in FIG. 20.

Referring now to FIG. 21, after the centering device 68 is positioned in the pre-existing hole 50, a threaded nut 62 is tightened on a shank 82 of a fastener 80 of the alignment device 60. As the threaded nut 62 is tightened, the threaded nut applies a force to the centering device 68 which bulges or deforms outwardly against the pre-existing hole 50. In this manner, the alignment device 60 is secured or interconnected to the work-piece 54. Optionally, a wrench or socket 56 may be used to rotate the threaded nut 62.

Referring now to FIG. 22, a pilot 36 of a rotary cutting tool 30 is aligned with a bore 84 through the fastener 80. The rotary cutting tool 30 is powered to cut through the work-piece 54 to create a larger hole as shown in FIG. 23.

In various embodiments of the present disclosure, a method of forming a cut or aperture in a work piece 54 is provided. In one embodiment, a method is provided that comprises the steps of securing a centering device 68 to the work piece 54, wherein the centering device comprises a female receiving portion 84 provided concentrically with an existing aperture 50 in the work piece. The centering device 68 is preferably clamped or secured to the work piece by a fastener 80 comprising at least one of a threaded shaft 82 and a nut 62. A rotary cutting tool 30 is provided with a circular cutting device 31 and a pilot member 36. The pilot member 36 is provided in the female receiving portion 84 of the centering device 68, and the rotary cutting tool is powered and/or drive to create a hole in the workpiece 54 that is larger than the centering device 68.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A tool configured for use with a rotary tool, the tool comprising:
   a rotary cutting tool comprising a circular cutting edge, a pilot member extending axially beyond the circular cutting edge, and a bit shank configured to be selectively coupled to the rotary tool;
   a centering device comprising:
      a frustoconical body with a distal end having a first diameter and a proximal end having a second diameter, wherein the first diameter is less than the second diameter, and wherein the frustoconical body is formed of one of a compressible material and an elastomeric material; and
      a first bore through the frustoconical body;
   a fastener positioned within the first bore of the centering device, the fastener including a shank having a length greater than a length of the first bore through the frustoconical body, threads formed on at least a portion of the shank, and a second bore through the shank operable to receive the pilot member, wherein the rotary cutting tool is axially-displaceable relative to the centering device; and
   a threaded nut operable to engage the threads of the shank, wherein the threaded nut is operable to compress the frustoconical body to engage an aperture in a workpiece.

2. The tool of claim 1, further comprising a bearing within the second bore.

3. The tool of claim 1, wherein the rotary cutting tool is positioned proximate to the proximal end of the frustoconical body that extends from a proximal side of the workpiece, and wherein the rotary cutting tool is rotatable relative to the second bore of the fastener.

4. The tool of claim 1, wherein the fastener is fixed within the first bore.

5. The tool of claim 1, further comprising a flange extending from a distal end of the shank of the fastener, wherein the flange engages the distal end of the frustoconical body.

6. The tool of claim 1, wherein, when the frustoconical body is engaged to the aperture, the proximal end of the frustoconical body extends from a proximal side of the workpiece facing the rotary cutting tool and the distal end of the frustoconical body extends into the aperture of the workpiece away from the rotary cutting tool.

7. The tool of claim 5, wherein the flange has a tapered cross section with a diameter that increases as the flange extends axially away from the shank.

8. The tool of claim 5, wherein the flange is integrally formed with the fastener.

9. The tool of claim 1, wherein the frustoconical body further comprises a sidewall extending around the frustoconical body from the distal end to the proximal end.

10. The tool of claim 1, wherein the frustoconical body is formed of rubber.

11. The tool of claim 1, wherein the first bore has a substantially constant diameter, and wherein the second bore has a substantially constant diameter.

12. The tool of claim 9, wherein the sidewall has a conical shape that extends continuously around the frustoconical body.

13. The tool of claim 1, wherein the pilot has one or more of:
    a substantially smooth exterior surface; and
    a distal end with a frustoconical shape.

14. The tool of claim 1, wherein the threads of the fastener shank extend from the proximal end of the frustoconical body, and wherein the threaded nut contacts the proximal end of the frustoconical body.

15. An alignment device to guide a rotary cutting tool to create an aperture in a workpiece, comprising:
    a centering device that is operable to engage a pre-existing hole in the workpiece, the centering device including a body portion with a distal end with a first diameter, a proximal end with a second diameter, a sidewall extending from the distal end to the proximal end, and a first bore extending through the body portion from the distal end to the proximal end, wherein the second diameter is greater than the first diameter, and wherein the body portion is formed of one of a compressible material and an elastomeric material;
    a fastener including a shank with a threaded portion and a second bore through the shank, the shank positioned within the first bore such that the threaded portion of the shank extends from the proximal end of the body portion; and
    a threaded nut engaged to the threaded portion of the shank, wherein the threaded nut is operable to apply a force to the proximal end of the body portion of the centering device such that at least a portion of the sidewall of the body portion expands outwardly to secure the centering device in the aperture of the workpiece.

16. The alignment device of claim 15, wherein the body portion of the centering device has a frustoconical shape and the sidewall has a conical shape extending between the distal end and the proximal end.

17. The alignment device of claim 15, wherein the compressible material of the body portion is a rubber.

18. The alignment device of claim 15, wherein the shank of the fastener is rotationally fixed within the first bore, and the second bore is configured to receive a rotating pilot of the rotary cutting tool without translating a rotational force to the fastener.

19. A method of forming an aperture in a work-piece with a pre-existing hole, comprising:
 providing a centering device including a body portion formed of a compressible material and with a small end, a large end, a bore extending from the small end to the large end, and a fastener extending through the bore with a threaded shank extending from the large end;
 extending the small end of the body portion of the centering device into the pre-existing hole such that the body portion of the centering device contacts the work-piece and the large end of the body portion extends outwardly from a proximal side of the work-piece;
 tightening a nut on the threaded shank of the fastener such that the body portion is compressed by the fastener, wherein a portion of the body portion expands outwardly and the centering device is clamped to the work-piece;
 providing a rotary cutting tool with a circular cutting device;
 aligning a pilot of the rotary cutting tool with a second bore extending through the fastener, wherein the rotary cutting tool is proximate to the large end of the body portion on the proximal side of the work-piece; and
 rotating the rotary cutting tool to form the aperture in the work-piece as the rotary cutting tool moves toward the small end of the body portion.

20. The method of claim 19, further comprising placing a washer on the threaded shank between the nut and the large end of the body portion.

* * * * *